(12) United States Patent
Weaver et al.

(10) Patent No.: US 10,800,117 B2
(45) Date of Patent: Oct. 13, 2020

(54) METHOD OF FORMING AN ACOUSTIC BOND PANEL WITH INSERTABLE ACOUSTIC ASSEMBLIES

(71) Applicant: Rohr, Inc., Chula Vista, CA (US)

(72) Inventors: Luby Weaver, Redlands, CA (US); Shawn Michael Canela, Grand Terrace, CA (US)

(73) Assignee: Rohr, Inc., Chula Vista, CA (US)

( * ) Notice: Subject to any disclaimer, the term of this patent is extended or adjusted under 35 U.S.C. 154(b) by 185 days.

(21) Appl. No.: 15/486,079

(22) Filed: Apr. 12, 2017

(65) Prior Publication Data

US 2018/0297304 A1 Oct. 18, 2018
US 2019/0291367 A9 Sep. 26, 2019

Related U.S. Application Data

(62) Division of application No. 14/656,656, filed on Mar. 12, 2015, now Pat. No. 9,656,452.

(51) Int. Cl.

| | | |
|---|---|---|
| *B29C 73/10* | (2006.01) | |
| *B29C 70/34* | (2006.01) | |
| *B29C 65/48* | (2006.01) | |
| *B29C 65/00* | (2006.01) | |
| *B32B 3/12* | (2006.01) | |
| *B29C 70/86* | (2006.01) | |
| *B29D 99/00* | (2010.01) | |
| *B29K 105/08* | (2006.01) | |
| *B29L 31/30* | (2006.01) | |
| *B64D 33/02* | (2006.01) | |
| *B29C 73/04* | (2006.01) | |

(52) U.S. Cl.
CPC .......... *B29C 73/10* (2013.01); *B29C 65/4835* (2013.01); *B29C 66/472* (2013.01); *B29C 70/342* (2013.01); *B29C 70/865* (2013.01); *B29D 99/001* (2013.01); *B32B 3/12* (2013.01); *B29C 73/04* (2013.01); *B29K 2105/0872* (2013.01); *B29L 2031/3076* (2013.01); *B64D 2033/0206* (2013.01)

(58) Field of Classification Search
CPC ......... B29C 73/00; B29C 73/10; B29C 73/06; B29C 65/00; B29C 65/48; B29C 66/472; B29L 2031/3076; B64C 5/12
See application file for complete search history.

(56) References Cited

U.S. PATENT DOCUMENTS

| | | |
|---|---|---|
| 3,734,234 A | 5/1973 | Wirt |
| 3,821,999 A | 7/1974 | Guess et al. |
| 3,913,702 A | 10/1975 | Wirt et al. |
| 4,257,998 A | 3/1981 | Diepenbrock, Jr. et al. |

(Continued)

FOREIGN PATENT DOCUMENTS

GB 2252075 7/1992

*Primary Examiner* — Peter L Vajda
*Assistant Examiner* — S. Behrooz Ghorishi
(74) *Attorney, Agent, or Firm* — Snell & Wilmer L.L.P.

(57) ABSTRACT

A method may comprise applying a first adhesive to a cavity of a bond panel, the cavity defined by a raised body portion of the bond panel, inserting an acoustic insert assembly in the cavity, the acoustic insert assembly being secured in the cavity by the first adhesive, and securing edges of the acoustic insert assembly to the raised body portion of the bond panel with a second adhesive to create a seamless interface between the edges and the raised body portion.

10 Claims, 6 Drawing Sheets

(56) References Cited

U.S. PATENT DOCUMENTS

| | | | |
|---|---|---|---|
| 4,416,349 A | 11/1983 | Jacobs | |
| 5,923,003 A | 7/1999 | Arcas et al. | |
| 5,969,057 A * | 10/1999 | Schoeley | C09J 183/04 |
| | | | 525/474 |
| 5,975,237 A | 11/1999 | Welch | |
| 7,625,618 B1 | 12/2009 | Allen | |
| 7,935,205 B2 * | 5/2011 | Bogue | B29C 73/06 |
| | | | 156/252 |
| 8,469,146 B2 * | 6/2013 | Bornert-Dano | B64F 5/00 |
| | | | 181/284 |
| 8,636,107 B2 * | 1/2014 | Moutier | B29C 73/04 |
| | | | 181/292 |
| 9,656,452 B2 | 5/2017 | Weaver | |
| 2006/0118357 A1 | 6/2006 | Braun | |
| 2009/0283356 A1 | 11/2009 | Tsugihashi | |
| 2013/0251510 A1 | 9/2013 | Runyan | |
| 2015/0110603 A1 | 4/2015 | Biset et al. | |
| 2016/0063984 A1 * | 3/2016 | Kosonen | C08K 7/02 |
| | | | 252/62 |

\* cited by examiner

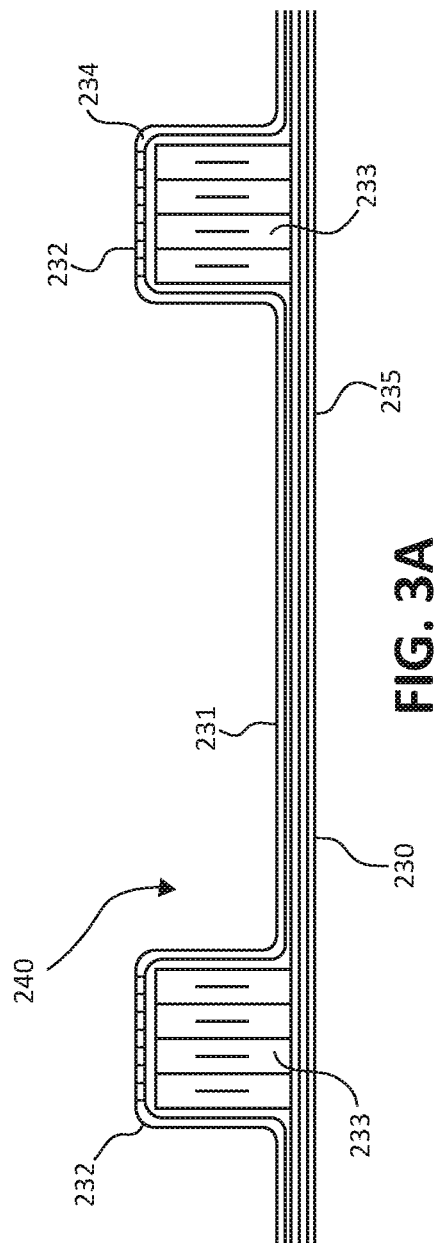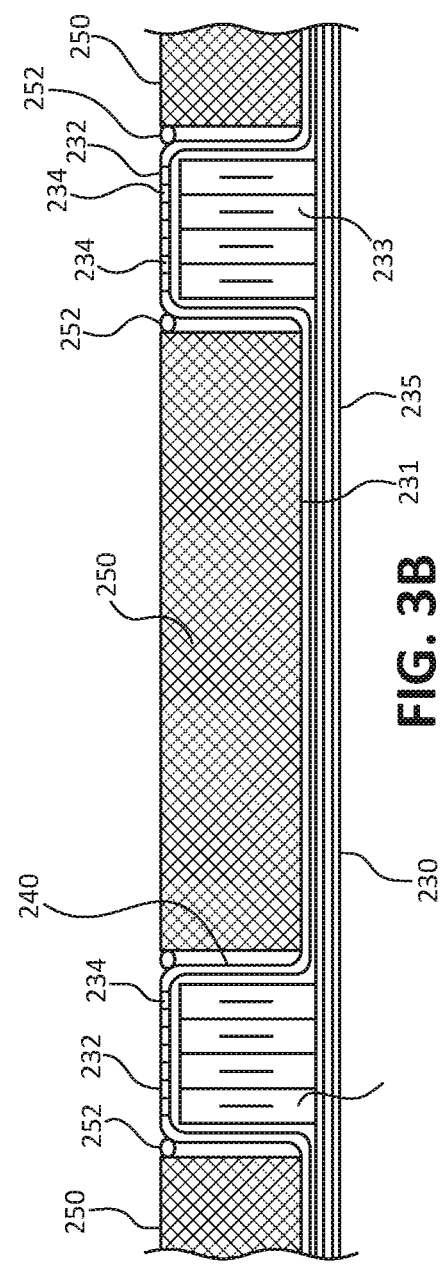

METHOD OF FORMING AN ACOUSTIC BOND PANEL WITH INSERTABLE ACOUSTIC ASSEMBLIES

CROSS REFERENCE TO RELATED APPLICATIONS

This application is a divisional of, and claims priority to, and the benefit of U.S. patent application Ser. No. 14/656,656, filed on Mar. 12, 2015, and entitled "METHOD OF FORMING AN ACOUSTIC BOND PANEL WITH INSERTABLE ACOUSTIC ASSEMBLIES" which is incorporated by reference herein in its entirety.

FIELD

The present disclosure relates to a method of forming an acoustic bond panel.

BACKGROUND

Acoustic bond panels with composite skins are widely used in modern nacelle systems for aircraft with turbofan propulsion systems. Typically, such a bond panel is constructed by first forming a composite top skin in an autoclave on a bond tool. The top skin is then removed from the tool and undergoes a process to perforate it with many small holes. Then, the perforated top skin is repositioned on a bond assembly tool and is built up into a bond panel assembly by adding core blankets and another layer of fiber or prepreg to form a back skin. This bond panel assembly is then cured in an autoclave to form a complete panel. This typical process includes several steps and two runs in an autoclave, all of which drive its cost up. Also, all of the materials or elements of the bond panel must be capable of withstanding the temperature and pressure of the cure cycle produced in the autoclave, which imposes certain limitations on the type of core used. A new process is needed which reduces the number of steps and autoclave runs, and allows flexibility for some materials or elements to be joined to or formed into the panel outside of an autoclave. Such elements could then be constructed from materials not able to withstand the temperatures and forces generated in the autoclave.

SUMMARY

A method of installation and/or repair of an acoustic insert assembly in a nacelle are provided. The method may comprise applying a first adhesive to a cavity of a bond panel, the cavity defined by a raised body portion of the bond panel; inserting an acoustic insert assembly in the cavity, the acoustic insert assembly being secured in the cavity by the first adhesive; and securing edges of the acoustic insert assembly to the raised body portion of the bond panel with a second adhesive to create a seamless interface between the edges and the raised body portion. The method may further comprise removing a damaged acoustic insert assembly from the cavity of the bond panel of an aircraft nacelle during the repair operation.

A method for manufacturing a bond panel is provided. In various embodiments, the method may comprise laying up a top skin on a tool comprising a mandrel. The method may further comprise laying out core on the top skin. The method may further comprise laying up back skin to create an assembly. The assembly may comprise the top skin, the core, and the back skin. The method may further comprise placing the assembly in a bag to provide a bagged assembly. The method may also comprise placing the bagged assembly in an autoclave. The method may further comprise subjecting the bagged assembly to a pressure and a temperature for a determined amount of time. In this regard, the back skin, the core, and the top skin may be co-cured in a single autoclave pressurization and heating operation.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 3A illustrates a partial cross-sectional view of a bond panel comprising a plurality of cavities, in accordance with various embodiments;

FIG. 3B illustrates a partial cross-sectional view of a bond panel comprising a plurality of cavities, where each of the plurality of cavities comprises an exemplary acoustic baffle structure, in accordance with various embodiments;

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Figure 1:
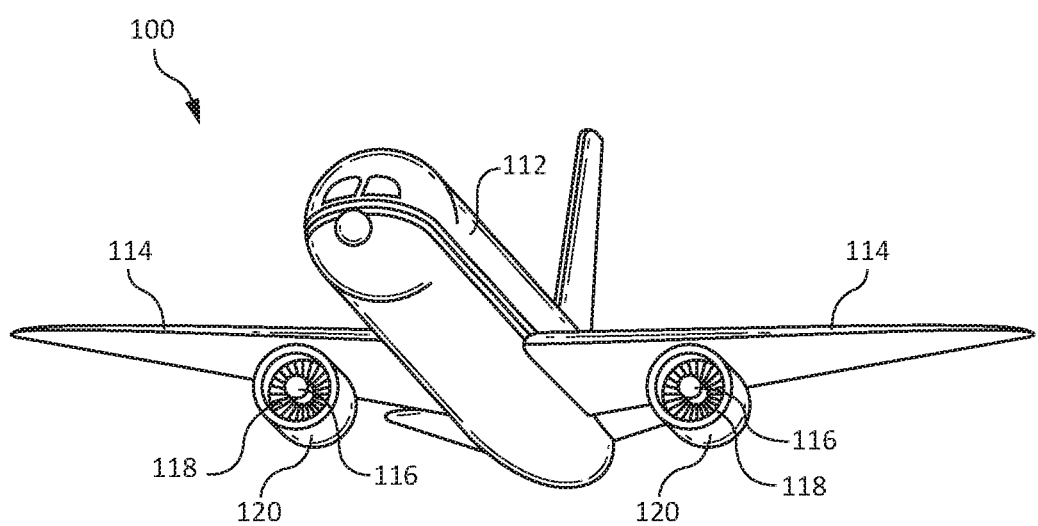
FIG. 1 illustrates a perspective view of an aircraft, in accordance with various embodiments.

In various embodiments and with reference to FIG. 1, an aircraft 100 may comprise a fuselage 112 and a pair of wings 114. Propulsion system 116 (e.g., a turbofan jet engine with a nacelle assembly) may be mounted on the underside of wing 114. Propulsion system 116 may be configured to provide forward thrust and/or propulsion for aircraft 100.

In various embodiments, propulsion system 116 may comprise an engine including an engine core and a fan 118, a pylon, and a nacelle 120 (e.g., a nacelle assembly and/or a nacelle package). Nacelle 120 may generally surround the engine core and fan 118. Nacelle 120 may include structures, such as, for example, the inner fixed structure or IFS, the inner barrel, and/or the inner surface of the translating sleeve that are typically made from bond panels with acoustic treatment to minimize engine noise during aircraft operation.

Figure 2:
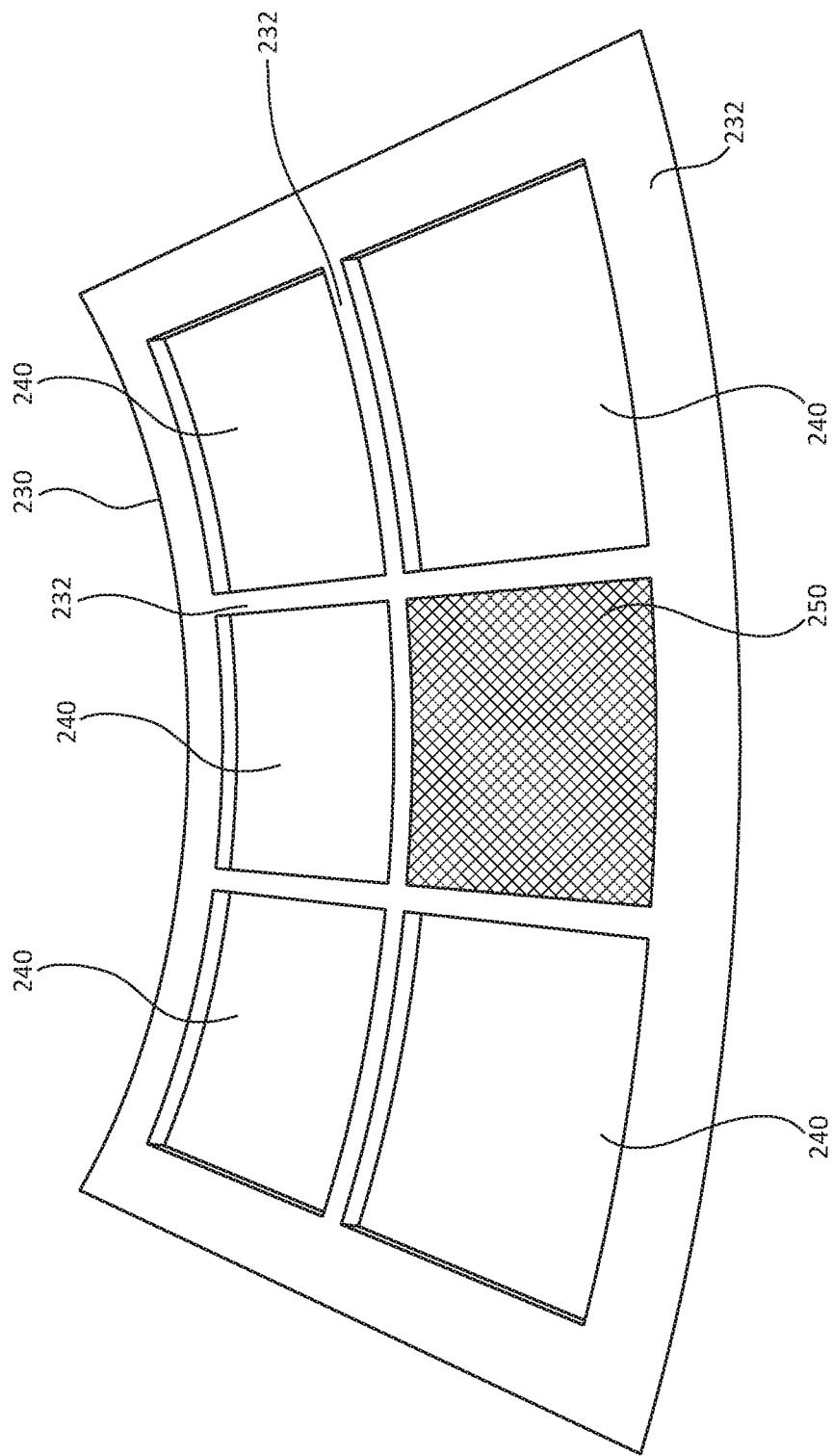
FIG. 2 illustrates a perspective view of a bond panel comprising a plurality of cavities, with one cavity comprising an exemplary acoustic baffle structure, in accordance with various embodiments.

In various embodiments and with reference to FIG. 2 and FIG. 3, portions of the nacelle may comprise noise damping structures such as, for example, acoustic bond panels and/or sandwich panels (e.g., bond panel 230). An acoustic bond panel 230 may take varying forms, but typically comprises a top skin 231 (e.g., an airflow skin) and a back skin 235 (e.g., a back side skin) surrounding a core 233 structure such as, for example, a honeycomb core. The walls of core 233, along with the top skin and back skin, form many small resonating chambers. Top skin 231 may be perforated so that each resonating chamber is open to the ambient air that flows over the top skin. Moreover, bond panel 230 may comprise and/or define one or more ribs 232 that define one or more cavities 240. Like top skin 231, portions of ribs 232 may comprise perforations 234. In a known manner during its use, each resonating chamber is capable of returning an acoustic wave to the ambient air that matches source acoustic waves in frequency but is retarded one half of a wave length in order to create destructive interference which cancels acoustic noise.

Typically, an acoustic bond panel is manufactured by first forming a composite top skin in an autoclave on a bond tool. The top skin is then removed from the bond tool and undergoes a process to perforate it with many small holes. Then, the perforated top skin is repositioned on a bond assembly tool and is built up into a bond panel assembly by adding core blankets and another layer of fiber or prepreg to form a back skin. This bond panel assembly may then be cured in an autoclave to form a complete panel. This typical process includes several steps and two runs in an autoclave, all of which increase the cost of manufacturing. Also, all of the materials or elements of the bond panel must be capable of withstanding the temperature and pressure of the cure cycle produced in the autoclave, which imposes certain limitations on the type of core used. A new process is needed which reduces the number of steps and autoclave runs, and allows flexibility for some materials or elements to be joined to or formed into the panel outside of an autoclave. Such elements could then be constructed from materials not able to withstand the temperatures and forces generated in the autoclave.

In various embodiments and with reference again to FIGS. 2, 3A, and 3B, exemplary bond panel 230 may comprise one or more cavities 240. The one or more cavities 240 may be integrally formed in bond panel 230. The bond panel includes a top skin and a back skin, and a layer of core material between the top and back skins. The layer of core material is not continuous, large gaps are included where there is no core between the top and back skins. These gaps define the cavities 240. The back skin may preferably be made of multiple laminar layers of continuous woven or non-woven fibers, such as carbon fiber or fiberglass prepreg, or other materials that are bonded together in a thermoplastic or thermoset resign to form a composite structure. Of course, other materials and types of structure may be selected by those of ordinary skill in this art to suit a particular application. The top skin may also be formed in a similar manner, including by using substantially continuous layers of fiber, where the top skin flows continuously without a break down the edges of the core. The cavities constitute depressions in the top surface of the panel.

Cavities 240 may be any suitable size and/or shape. Some cavities 240 may have a first shape while other cavities 240 may have a second or third shape each different from the others. Or, each of cavities 240 may also each have the same shape. Possible shapes for the cavities 240 include a square, a rectangle, a trapezoid, and oval, an ellipse, a circle, a triangle, and/or any other suitable shape. Each shape of a cavity 240 will generally be a closed shape as each cavity will generally be surrounded and bounded by raised sections of the panel's top skin caused by the inclusion of core between the top and bottom skins. These raised sections of top skin may form bands between the cavities. The sides of the cavities and the sides of the core forming the bands may be straight, as illustrated, or possibly they may be chamfered or curved.

Each cavity 240 may be generally shaped to accept an acoustic insert assembly 250. The depth of the cavities is approximately the same as or slightly less than the depth of the core positioned between the top and back skins which forms the bands surrounding each cavity. This is so that the depth of the core which forms the acoustic insert assemblies 250 can be, if desired, approximately the same as or slightly less than the depth of the core between the top and back skins. The depth of the core is important because it determines the frequency band that the acoustic treatment will damp.

Cavities 240 defined within bond panel 230 may be configured to receive and/or operatively couple with one or more acoustic insert assemblies 250. Acoustic insert assemblies 250 may be suitably sized and shaped to be operatively installed in one or more associated cavities 240. Acoustic insert assembly 250 may be secured to bond panel 230 with a suitable adhesive, including for example a low temperature adhesive such as room temperature vulcanizing ("RTV") silicone. Moreover, the perimeter edges of the acoustic insert assembly 250 may be sealed to the bond panel by a suitable seal 252. In this regard, seal 252 may create a smooth transition between bond panel 230 and acoustic insert assembly 250 reducing turbulence along the airflow surface of bond panel 230 and, as a result, reducing noise.

In various embodiments, an acoustic insert assembly 250 may comprise any suitable structure which forms, alone or when installed in the bond panel 230, an acoustic structure for attenuating acoustic noise. For example, as illustrated with acoustic insert assembly 250 in FIG. 3B, a top skin bonded or fastened to a core. The core and the top skin form an incomplete resonating cell because the bottom is open. When acoustic insert assembly 250 is installed in bond panel 230 the core abuts the bottom of the cavity formed in the panel and the resonating chamber is completed. Alternatively, acoustic insert assembly 250 may already comprise complete resonating chambers independent of the bond panel 230.

Acoustic insert assemblies 250 included in or installed in the bond panel 230 may be all of the same type. Or, advantageously, acoustic insert assemblies may be different from one another, for example each can be tuned to attack a different frequency of acoustic noise, in order to form a so-called zoned liner. With several different types of acoustic insert assemblies attacking several different frequencies of noise, the entire structure has more of a broadband noise attenuation capability to more effectively reduce engine noise.

As will be explained in further detail below, acoustic insert assemblies 250 may be bonded or fastened to the bond panel 230 without any autoclave curing. Thus, acoustic insert assemblies 250 may be made of any suitable structure or material, including, for example, structure that would not normally be adequate to withstand buckling in the high pressure of an autoclave, and including materials that may not sustain sufficient mechanical properties in the high temperatures of an autoclave. For example, acoustic insert assemblies 250 may be made of low strength, low temperature curing thermoplastic materials, which are highly suitable for injection molding or 3D printing processes. Acoustic insert assemblies 250 may be made with core that includes sidewalls that are not normal to the top skin and may not capable of withstanding high buckling forces, such as a slanted core described in U.S. patent application Ser. No. 14/056,815 filed Oct. 17, 2013, and assigned to Rohr, Inc., and entitled ACOUSTIC STRUCTURAL PANEL WITH SLANTED CORE, which is hereby incorporated by reference in its entirety for all purposes. These constitute just two examples of the types of acoustic structures and manufacturing processes that are facilitated by the concept disclosed herein.

In various embodiments, acoustic insert assemblies 250 may be non-structural components that are configured to provide damping, but are not structural (e.g., are out of the load path of bond panel 230). In various other embodiments, acoustic insert assemblies 250 may provide some structural support to bond panel 230. In this regard, acoustic insert assemblies 250 may be bonded to and/or otherwise operatively coupled to bond panel 230. The coupling or bonding may be accomplished by a doubler or other suitable bond.

Figure 4:
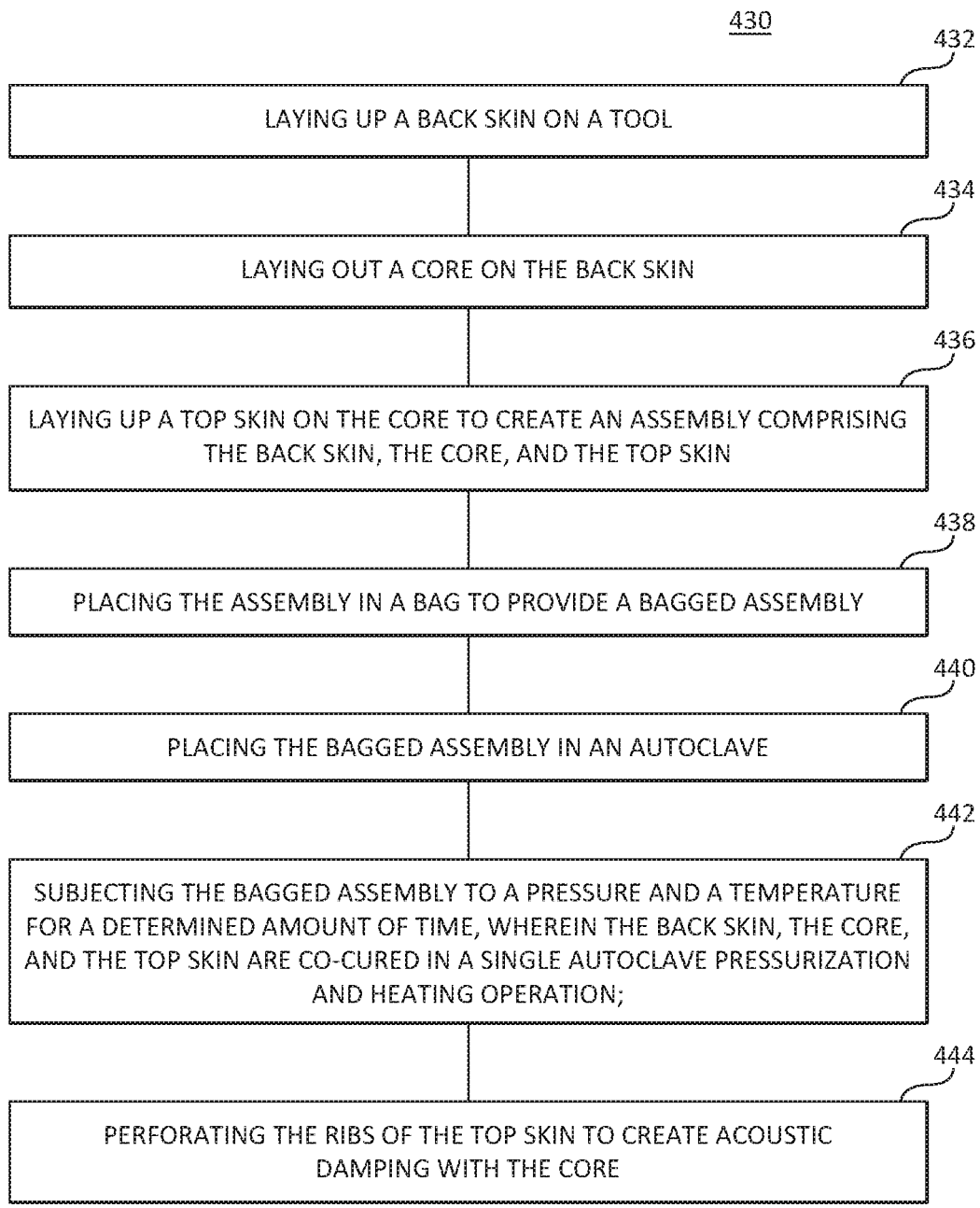
FIG. 4 is a process flow for a first bond panel manufacturing process, in accordance with various embodiments.

In various embodiments and with reference to FIG. 2 and FIG. 4, a method 430 for creating and/or manufacturing a bond panel and/or sandwich panel 230 is provided. Method 430 may comprise laying up a back skin 235 on a tool (Step 432). Method 430 may further comprise laying out a core 233 on back skin 235 (Step 434). Method 430 may further comprise laying up a top skin 231 on core 233 to create an assembly (Step 436). The assembly may comprise back skin 235, core 233, and the top skin 231. Method 430 may further comprise placing the assembly in a bag to provide a bagged assembly. In this regard, the assembly may be prepared for further processing (Step 440).

In various embodiments, method 430 may further comprise subjecting the bagged assembly to a pressure and a temperature for a determined amount of time (Step 442). Back skin 235, core 233, and top skin 231 may be co-cured in a single autoclave pressurization and heating operation. In this regard, bond panel 230 may be formed in a single autoclave operation. Method 430 may further comprise perforating the ribs 234 of top skin 231 to create acoustic damping with the core 233 (Step 444).

Figure 5:
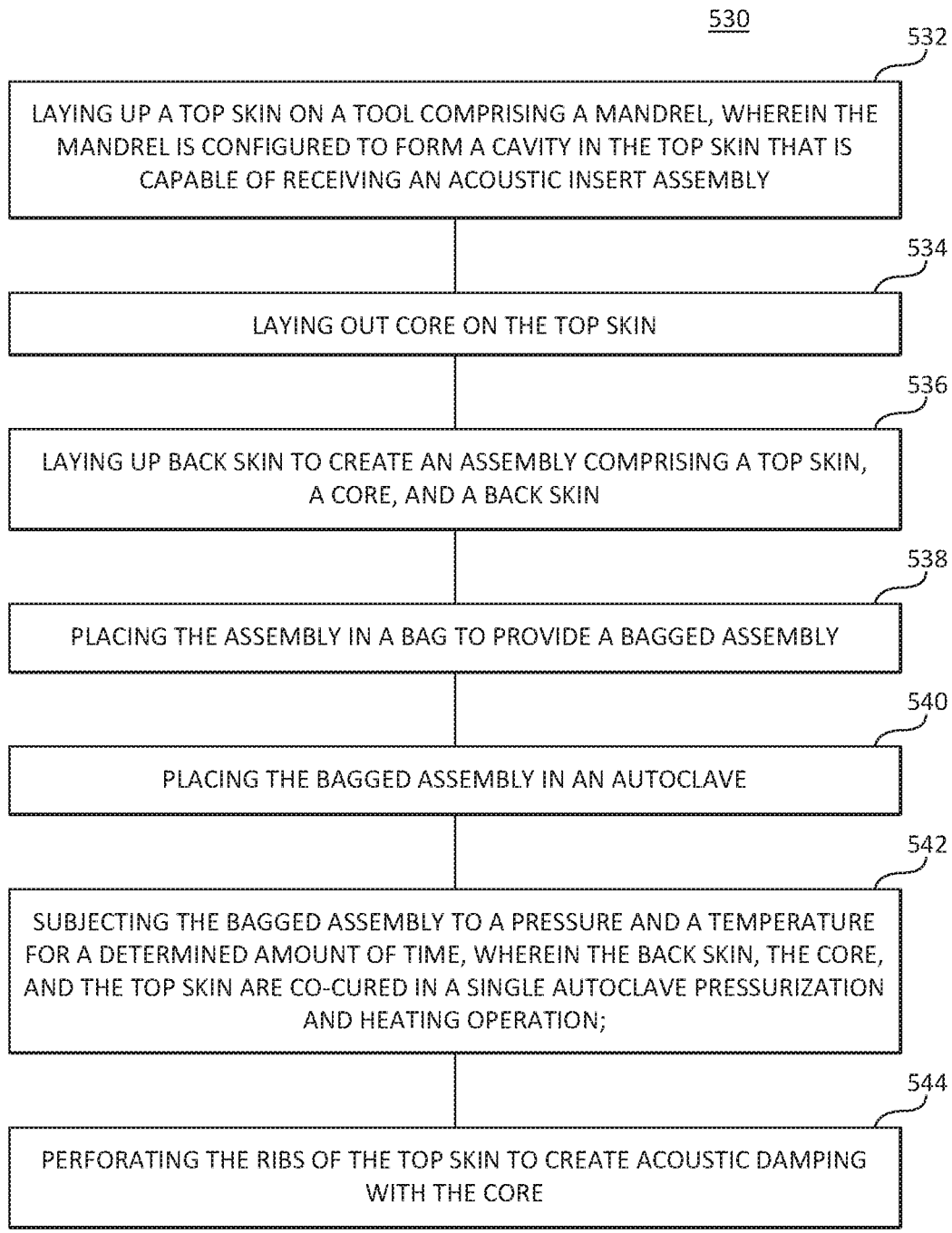
FIG. 5 is a process flow for a second bond panel manufacturing process, in accordance with various embodiments.

In various embodiments and with reference to FIG. 2 and FIG. 5, a method 530 for creating and/or manufacturing a bond panel and/or sandwich panel 230 is provided. Method 530 may comprise laying up top skin 231 on a tool (Step 532). The tool may comprise a mandrel. The mandrel may be configured to form a cavity in top skin 231 that is capable of receiving an acoustic insert assembly 250. Method 530 may further comprise laying out core 233 on the top skin 231 (Step 534). Method 530 may further comprise laying up back skin 235 to create an assembly (Step 536). The assembly may comprise top skin 231, core 233, and back skin 235. Method 530 may also comprise placing the assembly in a bag to provide a bagged assembly (Step 538). Method 530 may also comprise placing the bagged assembly in an autoclave (Step 540).

In various embodiments, method 530 may further comprise subjecting the bagged assembly to a pressure and a temperature for a determined amount of time. In this regard, back skin 235, core 233, and top skin 231 are co-cured in a single autoclave pressurization and heating operation. In this regard, bond panel 230 may be formed in a single autoclave operation. Method 530 may further comprise perforating the ribs 234 of top skin 231 to create acoustic damping with the core 233 (Step 544).

Figure 6:
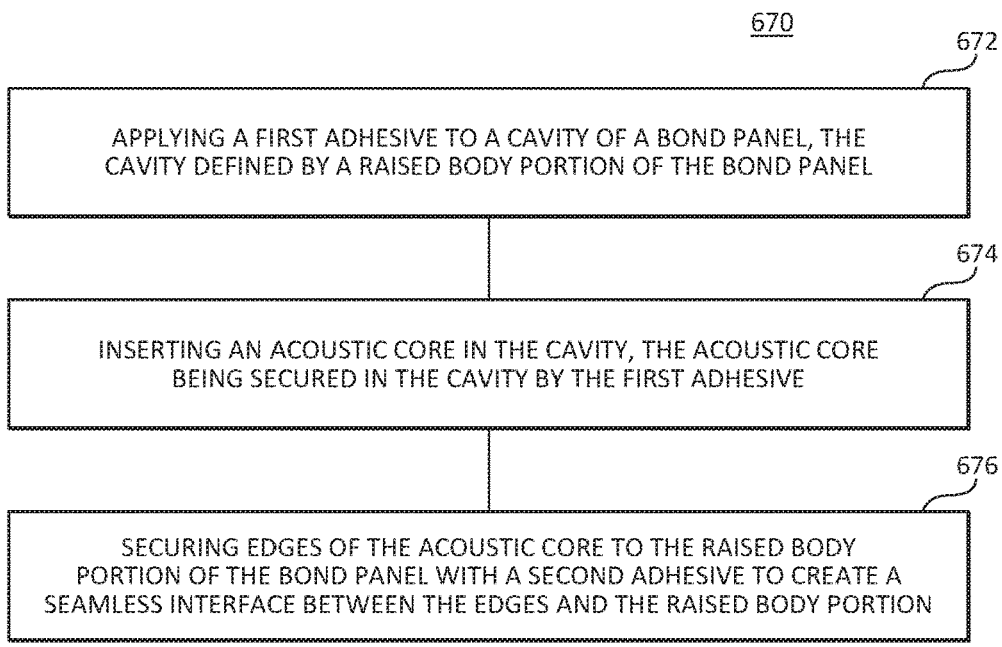
FIG. 6 is a process flow for an assembly process, in accordance with various embodiments.

In various embodiments and with reference to FIG. 6, a method 670 of manufacture for a bond panel with acoustic insert assemblies is provided. Method 670 may comprise applying a first adhesive to a cavity of a bond panel (step 672). The cavity may be defined by a raised body portion of the bond panel. Moreover, the first adhesive may be an adhesive that is configured to bond and/or cure at room temperature. For example, the first adhesive may be RTV silicone. In this regard, the first adhesive may be any suitable adhesive that is configured to cure at an ambient or relatively low temperature (e.g., room temperature) that is commonly used as an adhesive or a sealant in aerospace applications.

In various embodiments, method 670 may further comprise inserting an acoustic insert assembly in the cavity (step 674). The acoustic insert assembly may be secured in the cavity by the first adhesive. Moreover, the acoustic insert assembly may be made out of any suitable low temperature material that is not suitable for exposure to high temperature autoclave operations that would otherwise be suitable for forming the body portion of the bond panel.

In various embodiments, method 670 may further comprise securing the edges of the acoustic insert assembly to the raised body portion of the bond panel with the second adhesive (step 476). The use of the second adhesive may create a seamless interface between the edges of the acoustic insert assembly and the raised body portion. In this regard, the voids between the acoustic insert assembly and the body portion are eliminated by the second adhesive in order to reduce the turbulent effects of gaps within the interflow of surface and/or flow area, which is defined by the bond panel in the inner barrel of the nacelle of an aircraft.

Figure 7:
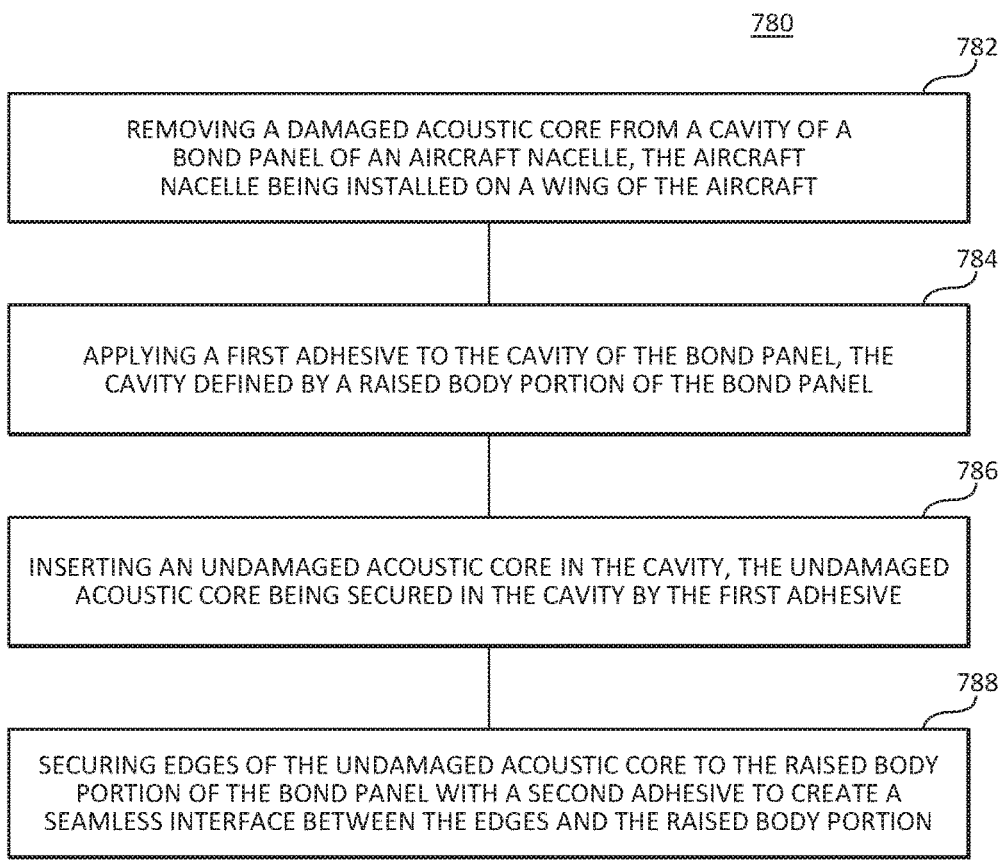
FIG. 7 is a process flow for a repair process, in accordance with various embodiments.

In various embodiments and with reference to FIG. 7, a method 780 of repair of portions of an aircraft nacelle is provided. Method 780 may allow a technician to repair one or more damaged portions of a nacelle (e.g., one or more acoustic portions) while the nacelle is on wing. In this regard, method 780 may provide significant cost and time savings as compared to traditional repair methods that require the nacelle to be removed from the wing for repair, or that require that the bond panel of the inner barrel of the nacelle be disassembled.

In various embodiments, method 780 may comprise removing a damaged acoustic insert assembly from a cavity of a bond panel of an aircraft nacelle (step 782). The aircraft nacelle may be installed on a wing of the aircraft. In this regard, the repair may take place on the ground and may not require that the nacelle be removed from the aircraft wing in order to replace one or more bond panel and/or acoustic sections. Moreover, the structure and/or structural integrity of the bond panel are not compromised during the removal of the damaged acoustic insert assembly. In response to the damaged acoustic insert assembly being removed, the cavity may be cleaned and otherwise prepared for installation of an undamaged acoustic insert assembly.

In various embodiments, method 780 may further comprise applying a first adhesive to the cavity of the bond panel (step 784). As discussed herein, the first adhesive may be an adhesive that is capable of curing at suitable ambient temperatures. For example, the first adhesive may be RTV silicone, which may be commonly used as an adhesive or a sealant in aerospace applications. Method 780 may further comprise inserting an acoustic insert assembly (e.g., an undamaged acoustic insert assembly) in the cavity (step 786). The acoustic insert assembly may be secured in the cavity by the first adhesive. Moreover, the acoustic insert assembly may be made out of any suitable low temperature material that is not suitable for use with structures that are made with high temperature autoclave operations that would otherwise be suitable for forming the body portion of the bond panel.

In various embodiments, method 780 may further comprise securing the edges of the acoustic insert assembly to the raised body portion of the bond panel with the second adhesive (step 788). The use of the second adhesive may create a seamless interface between the edges of the acoustic insert assembly and the raised body portion. In this regard, the voids between the acoustic insert assembly and the body portion are eliminated by the second adhesive in order to reduce the turbulent effects of gaps within the interflow of surface and/or flow area, which is defined by the bond panel in the inner barrel of the nacelle of an aircraft.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
    applying a first adhesive to a cavity of a bond panel, wherein the bond panel comprises a top skin, a back skin, and a layer of core material located between the top skin and the back skin, the cavity is defined by a raised body portion of the bond panel, the raised body portion comprises a raised section of the top skin of the bond panel, the layer of core material is located between the raised section of the top skin and the back skin, and the top skin flows continuously down an edge of the layer of core material;
    inserting an acoustic insert assembly in the cavity, the acoustic insert assembly being secured in the cavity by the first adhesive; and
    securing edges of the acoustic insert assembly to the raised body portion of the bond panel with a second adhesive to create a seamless interface between the edges and the raised body portion.

2. The method of claim 1, further comprising removing a damaged acoustic insert assembly from the cavity of the bond panel of an aircraft nacelle.

3. The method of claim 2, wherein a repair operation occurs when the aircraft nacelle is installed on a wing of an aircraft.

4. The method of claim 2, further comprising cleaning the cavity associated with the damaged acoustic insert assembly.

5. The method of claim 1, wherein the acoustic insert assembly is made by at least one of a rapid prototyping operation or an injection molding operation.

6. The method of claim 1, wherein the acoustic insert assembly is made from plastic.

7. The method of claim 1, wherein the first adhesive is room temperature vulcanizing silicon.

8. The method of claim 1, wherein the bond panel defines a first cavity having a first shape and a second cavity having a second shape.

9. The method of claim 1, wherein the cavity is integrally formed in the bond panel.

10. The method of claim 9, wherein the cavity is defined by a depression in the top skin.

* * * * *